United States Patent
Morotomi et al.

(10) Patent No.: US 9,321,484 B2
(45) Date of Patent: Apr. 26, 2016

(54) COLLISION AVOIDANCE ASSISTANCE DEVICE AND COLLISION AVOIDANCE ASSISTANCE METHOD

(71) Applicant: TOYOTA JIDOSHA KABUSHIKI KAISHA, Toyota-shi, Aichi (JP)

(72) Inventors: Kohei Morotomi, Toyota (JP); Eiji Kasai, Toyota (JP); Tomonori Akiyama, Shizuoka (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/758,895

(22) PCT Filed: Feb. 19, 2013

(86) PCT No.: PCT/JP2013/054000
§ 371 (c)(1),
(2) Date: Jul. 1, 2015

(87) PCT Pub. No.: WO2014/128832
PCT Pub. Date: Aug. 28, 2014

(65) Prior Publication Data
US 2015/0353134 A1 Dec. 10, 2015

(51) Int. Cl.
*B62D 15/02* (2006.01)
*B62D 6/00* (2006.01)
*B62D 5/04* (2006.01)

(52) U.S. Cl.
CPC ............ *B62D 15/0265* (2013.01); *B62D 5/046* (2013.01); *B62D 6/002* (2013.01)

(58) Field of Classification Search
CPC .......................... B62D 5/0463; B60W 50/0205
See application file for complete search history.

(56) References Cited

U.S. PATENT DOCUMENTS

| 7,584,816 | B2 * | 9/2009 | Miyajima | B62D 5/006 180/421 |
| 7,702,442 | B2 * | 4/2010 | Takenaka | B60G 17/0195 701/41 |
| 7,832,522 | B2 * | 11/2010 | Akuta | B62D 6/002 180/400 |
| 2008/0027609 | A1 * | 1/2008 | Aoki | B62D 5/0463 701/43 |
| 2008/0294313 | A1 * | 11/2008 | Aoki | B62D 5/0463 701/43 |
| 2012/0271516 | A1 * | 10/2012 | Takahashi | B62D 5/0472 701/42 |
| 2013/0261894 | A1 * | 10/2013 | Kojima | B62D 5/0463 701/41 |

FOREIGN PATENT DOCUMENTS

JP 2012-183906 A 9/2012

* cited by examiner

*Primary Examiner* — Thomas Tarcza
*Assistant Examiner* — Alex C Dunn
(74) *Attorney, Agent, or Firm* — Sughrue Mion, PLLC

(57) ABSTRACT

A collision avoidance assistance device includes a target control amount calculation unit configured to calculate a target control amount used for travelling on a target trajectory through which the vehicle passes, a first control amount calculation unit configured to calculate a first control amount to be applied by the first steering assistance system out of the target control amount, and output the first control amount to the first steering assistance system, and a second control amount calculation unit configured to calculate a second control amount to be applied by the second steering assistance system out of the target control amount, and output the second control amount to the second steering assistance system. The first control amount is set to be larger than the second control amount during a predetermined time period from a time of starting the collision avoidance assistance.

6 Claims, 3 Drawing Sheets

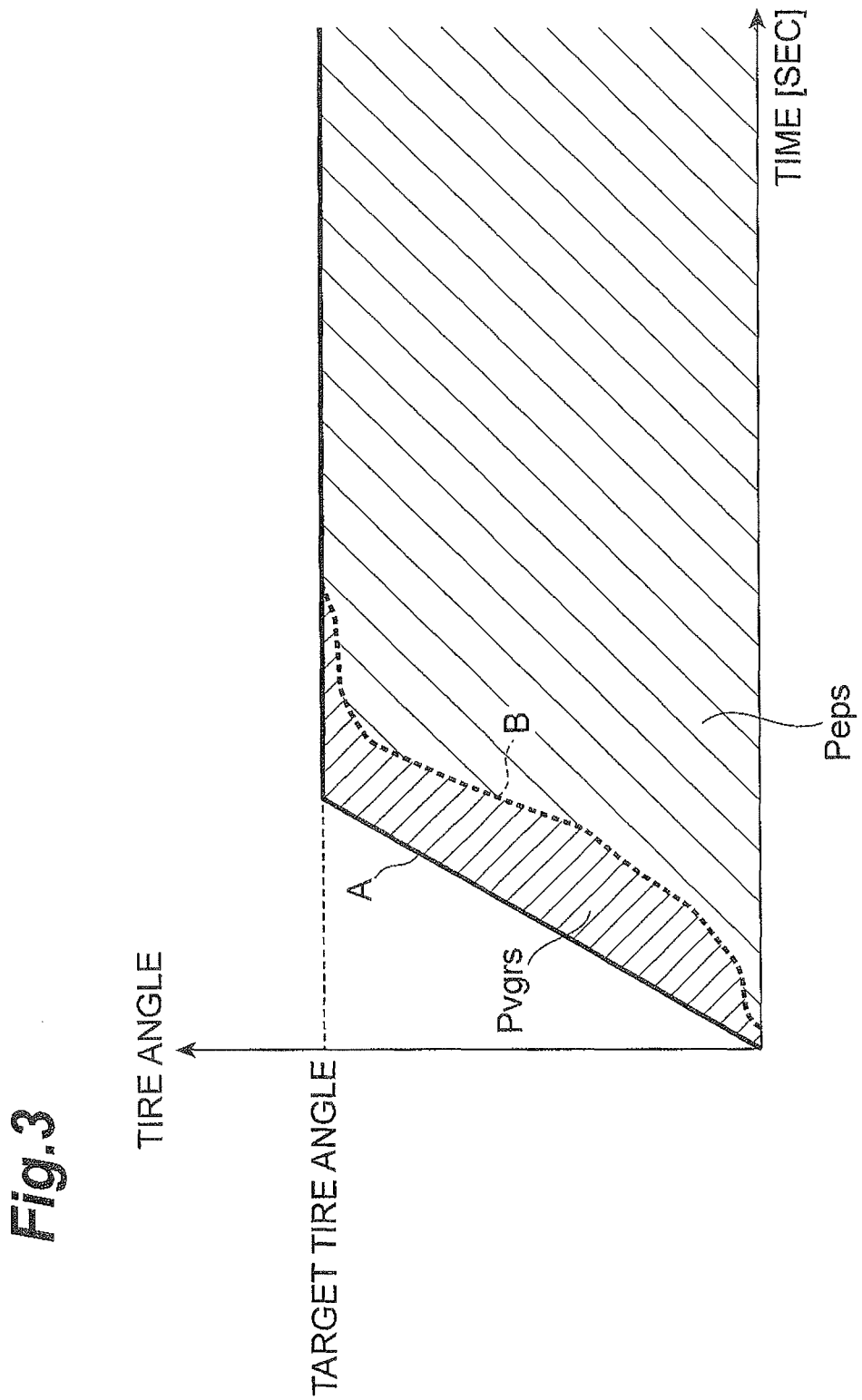

COLLISION AVOIDANCE ASSISTANCE DEVICE AND COLLISION AVOIDANCE ASSISTANCE METHOD

CROSS REFERENCE TO RELATED APPLICATIONS

This application is a National Stage of International Application No. PCT/JP2013/054000 filed Feb. 19, 2013, the contents of all of which are incorporated herein by reference in their entirety.

TECHNICAL FIELD

The present invention relates to a collision avoidance assistance device and a collision avoidance assistance method.

BACKGROUND ART

There is a steering assistance device configured to perform an auxiliary steering using a steering control system which is independent from a steering operation of a driver (for example, refer to Patent Literature 1). In this steering assistance device, interference between a steering force of the driver and a steering force of the system is reduced.

CITATION LIST

Patent Literature

[Patent Literature 1] Japanese Unexamined Patent Application Publication No. 2012-183906

SUMMARY OF INVENTION

Technical Problem

In the above-described steering assistance device, a direction of a vehicle changes while a force is not added to a steering wheel (steering handle) at the time of system operation. For this reason, if the above technology is applied to a collision avoidance assistance device, there is a problem in that the direction of the vehicle changes despite that the driver does not perform the steering operation. In addition, if the system operates when the driver performs the steering operation, there may be a case where the direction of the vehicle changes in excess of the steering intended by the driver or a case where the direction of vehicle changes in a direction opposite to the steering intended by the driver. In such cases, there is a problem in that the driver may feel an uncomfortable feeling.

The present invention has an object to provide a collision avoidance assistance device and a collision avoidance assistance method in which the uncomfortable feeling of the driver can be reduced.

Solution to Problem

A collision avoidance assistance device according to an aspect of the present invention is a collision avoidance assistance device configured to perform collision avoidance assistance by a first steering assistance system in which a reaction force is not generated against a steering wheel and a second steering assistance system in which a reaction force is generated against the steering wheel. The collision avoidance assistance device includes a target control amount calculation unit configured to calculate a target control amount used for travelling on a target trajectory through which the vehicle passes, a first control amount calculation unit configured to calculate a first control amount to be applied by the first steering assistance system out of the target control amount, and output the first control amount to the first steering assistance system, and a second control amount calculation unit configured to calculate a second control amount to be applied by the second steering assistance system out of the target control amount, and output the second control amount to the second steering assistance system. The first control amount is set to be larger than the second control amount during a predetermined time period from a time of starting the collision avoidance assistance.

In the collision avoidance assistance device, during the predetermined time period from the time of starting the collision avoidance assistance, the first control amount is set to be larger than the second control amount. For this reason, during the predetermined time period from the time of starting the collision avoidance assistance, the control amount (steering force) is mainly given by the first steering assistance system in which the reaction force is not generated against the steering wheel, and a short portion of the control amount (steering force) is supplemented by the second steering assistance system in which the reaction force is generated against the steering wheel. In this way, the lateral acceleration can be increased while the behavior of the steering wheel is suppressed, and thus, it is possible to decrease the interference between the steering force by the driver and the steering force by the collision avoidance assistance device. As a result thereof, the uncomfortable feeling to the driver can be decreased.

In the collision avoidance assistance device according to another aspect of the present invention, the first control amount calculation unit may output the first control amount to the first steering assistance system before the second control amount calculation unit outputs the second control amount to the second steering assistance system. In this case, firstly, the steering force is given by the first steering assistance system, and thereafter, the steering force is given by the second steering assistance system. In this way, immediately after starting the collision avoidance assistance, the lateral acceleration can be increased while the behavior of the steering wheel is suppressed, and thus, it is possible to decrease the interference between the steering force by the driver and the steering force by the collision avoidance assistance device. Then, the reaction force is generated by the second steering assistance system and the steering force is given. In this way, it is possible to make the driver recognize the operation of the collision avoidance assistance and the direction of the steering assistance. Therefore, it becomes possible to further decrease the uncomfortable feeling to the driver.

In the collision avoidance assistance device according to still another aspect of the present invention, the first control amount calculation unit may decrease the rate of the first control amount to the target control amount as the time passes. In this case, since the control amount by the second steering assistance system increases as the time passes, the reaction force to the steering wheel is gradually generated. In this way, it is possible to suppress the rapid rotation of the steering wheel and to make the driver recognize the operation of the collision avoidance assistance and the direction of the steering assistance. As a result thereof, the uncomfortable feeling to the driver can be further decreased.

The collision avoidance assistance device according to still another aspect of the present invention may further include the notification unit configured to notify of the fact that the collision avoidance assistance is operating. In this case, it is possible to make the driver recognize the fact that the collision avoidance assistance is operating. Therefore, even if the vehicle shows a behavior different from the steering intended by the driver, the driver can determine that the behavior is the behavior by the collision avoidance assistance. Therefore, it becomes possible to further decrease the uncomfortable feeling to the driver.

In the collision avoidance assistance device according to still another aspect of the present invention, the notification unit may notify of the direction of the target trajectory. In this case, it is possible to make the driver recognize the direction of the target trajectory, and thus, even if the vehicle shows a behavior different from the steering intended by the driver, the driver can determine that the behavior is the behavior by the collision avoidance assistance. Therefore, it becomes possible to further decrease the uncomfortable feeling to the driver.

A collision avoidance assistance method in an aspect to the present invention is a collision avoidance assistance method for performing collision avoidance assistance by a first steering assistance system in which a reaction force is not generated against a steering wheel and a second steering assistance system in which a reaction force is generated against the steering wheel. The collision avoidance assistance method includes a target control amount calculation step of calculating a target control amount used for travelling on a target trajectory through which the vehicle passes, a first control amount calculation step of calculating a first control amount to be applied by the first steering assistance system out of the target control amount, and outputting the first control amount to the first steering assistance system, and a second control amount calculation step of calculating a second control amount to be applied by the second steering assistance system out of the target control amount, and outputting the second control amount to the second steering assistance system. The first control amount is set to be larger than the second control amount during a predetermined time period from a time of starting the collision avoidance assistance.

In the collision avoidance assistance method, during the predetermined time period from the time of starting the collision avoidance assistance, the first control amount is set to be larger than the second control amount. For this reason, during the predetermined time period from the time of starting the collision avoidance assistance, the steering force is mainly given by the first steering assistance system in which the reaction force is not generated against the steering wheel, and a short portion of the steering force is supplemented by the second steering assistance system in which the reaction force is generated against the steering wheel. In this way, the behavior of the steering wheel can be suppressed, and thus, it is possible to decrease the interference between the steering force by the driver and the steering force by the collision avoidance assistance. As a result thereof, the uncomfortable feeling to the driver can be decreased.

Advantageous Effects of Invention

According to the present invention, the uncomfortable feeling of the driver can be reduced.

BRIEF DESCRIPTION OF DRAWINGS

FIG. 3 is a diagram illustrating a relationship between a tire angle and the time.

DESCRIPTION OF EMBODIMENTS

Hereinafter, an embodiment of the present invention will be described in detail with reference to the drawings attached hereto.

Figure 1:
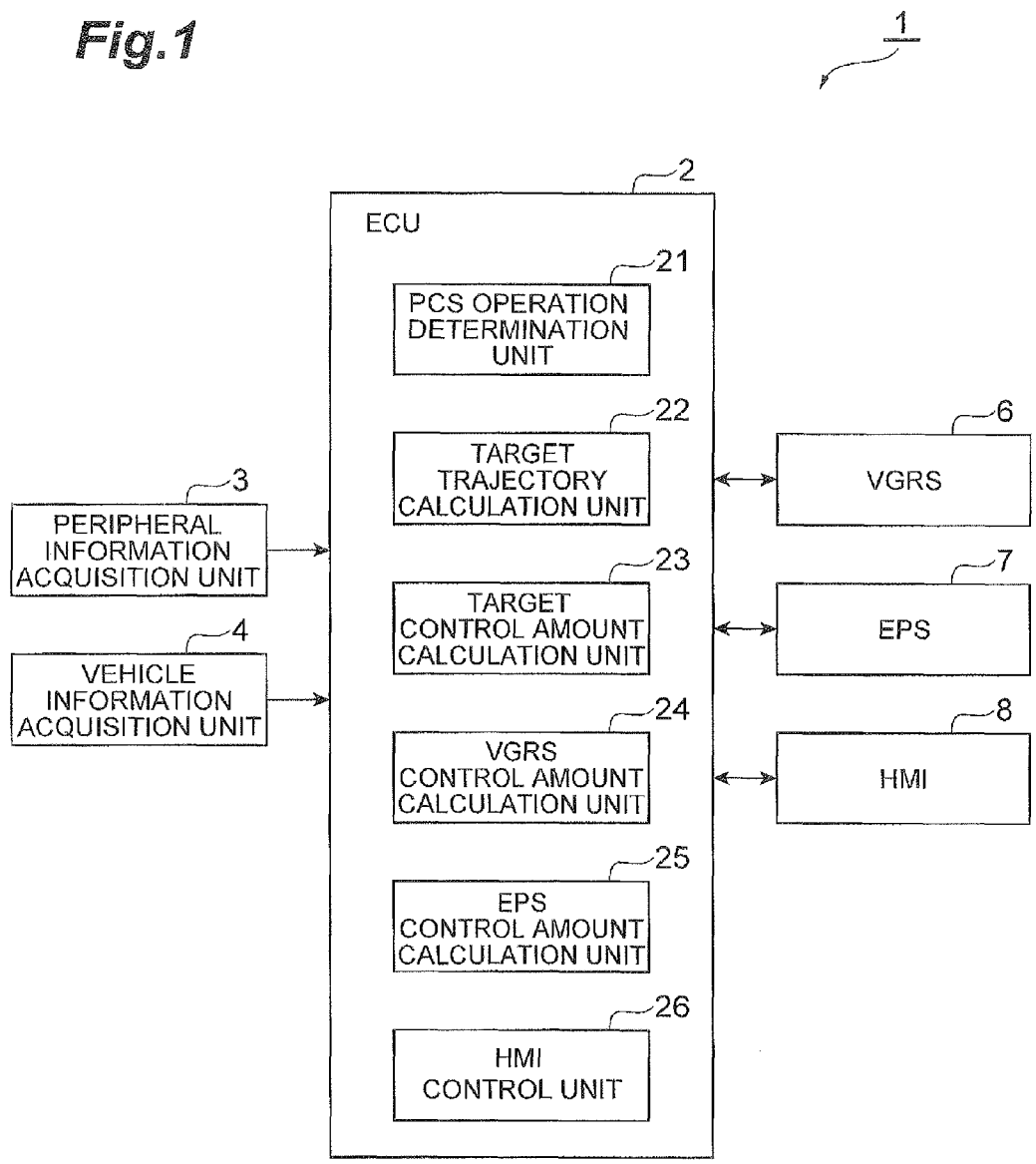
FIG. 1 is a block diagram of a collision avoidance assistance device in an embodiment.

FIG. 1 is a block diagram of a collision avoidance assistance device in an embodiment. The collision avoidance assistance device is a device that assists a vehicle control using a pre-crash safety system (PCS). The PCS is a system used for avoiding a collision between the vehicle and an object detected around the vehicle.

As illustrated in FIG. 1, a collision avoidance assistance device 1 includes an electronic control unit (ECU) 2, a peripheral information acquisition unit 3, a vehicle information acquisition unit 4, a variable gear ratio steering device (VGRS) 6 (first steering assistance system), an electronic control power steering device (EPS) 7 (second steering assistance system), and a human machine interface (HMI) 8 (notification unit).

The peripheral information acquisition unit 3 has a function of acquiring information around the vehicle. The peripheral information acquisition unit 3, for example, outputs obstacle information and travelable area information to the ECU 2. The obstacle information is information relating to a detected obstacle. The travelable area information is information relating to an area where the vehicle can travel. The peripheral information acquisition unit 3 includes, for example, radar and an image sensor. The radar detects the obstacle around the vehicle using a millimeter wave or laser and outputs the obstacle information relating to the detected obstacle to the ECU 2. The image sensor is, for example, a single lens camera or a stereo camera, and images a predetermined range around the vehicle for each predetermined time for generating image data. The image sensor outputs the obstacle information and the travelable area information to the ECU 2 based on the generated image data.

The vehicle information acquisition unit 4 has a function of acquiring vehicle information indicating a travelling state of the vehicle. The vehicle information acquisition unit 4 outputs the acquired vehicle information to the ECU 2. The vehicle information acquisition unit 4 includes, for example, a tire angle sensor used for detecting a tire angle, a steering torque sensor used for detecting a steering torque (steering force) of the steering wheel, a vehicle speed sensor used for detecting a vehicle speed (traveling speed) of the vehicle, a global positioning system (GPS) receiver used for detecting a position of the vehicle, and a yaw rate sensor used for detecting a yaw rate of the vehicle. The tire angle, the steering torque, the vehicle speed, and the vehicle position are examples of the vehicle information.

The VGRS 6 is a steering assistance system in which a reaction force against the steering wheel is not generated, and is a system used for variably controlling a transfer ratio which is a rate of the turning angle (tire angle) of the turning wheel to a rotation angle of the steering wheel. The VGRS 6 includes, for example, an electric motor and a speed reduction gear, and appropriately changes an amount of rotation (or a rotation angle) of a turning output shaft connected to the speed reduction gear with respect to an amount of rotation (or a rotation angle) of a steering input shaft. The VGRS 6 causes the steering input shaft and the turning output shaft to relatively rotate, and adjusts the tire angle without a rotational operation of the steering wheel of the vehicle. That is, the VGRS 6 actively executes the tire angle control without depending on the steering operation of the driver.

The VGRS 6 receives a VGRS control amount output from the ECU 2 and performs the control of each device so as to obtain the VGRS control amount. The VGRS control amount is a control amount which is subject to be controlled by the VGRS 6. In a case where the VGRS 6 receives a VGRS reset request output from the ECU 2, the VGRS 6 resets the VGRS control amount and stops the control.

The EPS 7 is a steering assistance system in which the reaction force against the steering wheel is generated, and is a power steering system used for adjusting the steering torque of the vehicle and controlling the tire angle. The EPS 7 may be a rack and pinion typed one that is operated in response to the operation of steering wheel by the driver or may be a rack coaxial typed motorized one. The EPS 7 adjusts the tire angle with the rotational operation of the steering wheel of the vehicle. That is, the EPS 7 executes the tire angle control depending on the steering operation of the driver, for example, in synchronization with the steering operation.

The EPS 7 receives an EPS control amount output from the ECU 2 and performs the control of each device so as to obtain the EPS control amount. The EPS control amount is a control amount which is subject to be controlled by the EPS 7. In a case where the EPS 7 receives an EPS reset request output from the ECU 2, the EPS 7 resets the EPS control amount and stops the control.

The HMI 8 is an interface used for exchanging information between the collision avoidance assistance device 1 and the driver.

The HMI 8 includes, for example, a display such as a head up display (HUD) and a speaker. In a case where the HMI 8 receives the HMI output request output from the ECU 2, the HMI 8 provides information to the driver as the drive assistance. The HMI 8 notifies the driver that the PCS is operating. The HMI 8 notifies the driver that, for example, the behavior of steering is suppressed by the PCS. Specifically, the HMI 8 may output a message saying "A direction of the vehicle is changed by the VGRS" by a voice, or may display the message on the meter or the HUD.

In addition, the HMI 8 may make the driver perceive the PCS operation in the steering system by vibrating the steering wheel. The HMI 8 may notify the driver of a direction of a target trajectory. The HMI 8 may notify the driver of the direction of the target trajectory by the strength of the speaker sound or a display position of a light indicator, or may notify the driver of the direction of the target trajectory by displaying an arrow on the display content. In a case where the HMI 8 receives a reset request output from the ECU 2, the HMI 8 resets the display and voice output, and stops the display and voice output.

The ECU 2 is an electronic control unit that performs the overall controls of the collision avoidance assistance device 1. The ECU 2 is mainly configured with a computer that includes, for example, a central processing unit (CPU), a read only memory (ROM), and a random access memory (RAM), and includes an input signal circuit, an output signal circuit, a power supply circuit, and the like. The ECU 2 includes a PCS operation determination unit 21, a target trajectory calculation unit 22, a target control amount calculation unit 23, a VGRS control amount calculation unit 24 (first control amount calculation unit), an EPS control amount calculation unit 25 (second control amount calculation unit), and an HMI control unit 26.

The PCS operation determination unit 21 has a function of determining whether or not the PCS operation start condition is satisfied. For example, in a case where the existence of the obstacle from which the vehicle should avoid is detected based on the obstacle information output from the peripheral information acquisition unit 3, the PCS operation determination unit 21 determines that the PCS operation start condition is satisfied. In a case where it is determined that the PCS operation start condition is satisfied, the PCS operation determination unit 21 causes the PCS to operate.

In addition, the PCS operation determination unit 21 has a function of determining whether or not a PCS end condition is satisfied. For example, in a case where it is detected based on the obstacle information output from the peripheral information acquisition unit 3 that the collision with the obstacle which is a collision avoidance target can be avoided, the PCS operation determination unit 21 determines that the PCS end condition is satisfied. In addition, for example, in a case where it is detected that an operation of ending the PCS is performed by the driver, the PCS operation determination unit 21 determines that the PCS end condition is satisfied.

The target trajectory calculation unit 22 has a function of calculating a target trajectory that is a trajectory through which the vehicle passes. For example, the target trajectory calculation unit 22 calculates the target trajectory based on the obstacle information and the travelable area information output from the peripheral information acquisition unit 3. In this case, the target trajectory calculation unit 22 takes a path on which the vehicle can avoid the obstacle as the target trajectory among the travelable area. The target trajectory calculation unit 22 may calculate the target trajectory by other methods, not limited to the above-described method.

The target control amount calculation unit 23 has a function of calculating a target control amount which is a control amount for traveling on the target trajectory calculated by the target trajectory calculation unit 22. For example, the target control amount calculation unit 23 calculates the target control amount based on the vehicle information output by the vehicle information acquisition unit 4. The target control amount calculation unit 23 calculates the target control amount from the position of the vehicle, the vehicle speed, the steering torque, the tire angle, and the like. The target control amount may be a control amount as long as the control amount for traveling on the target trajectory, and for example, a target tire angle and a target steering angle can be the examples of the target control amount.

The VGRS control amount calculation unit 24 has a function of calculating the VGRS control amount. The VGRS control amount calculation unit 24 calculates the VGRS control amount that is necessary for realizing the target control amount calculated by the target control amount calculation unit 23. The VGRS control amount calculation unit 24 calculates the VGRS control amount based on the vehicle information output from the vehicle information acquisition unit 4.

Specifically, during a predetermined period of time from the PCS operation start, the VGRS control amount calculation unit 24 calculates a maximum value within the range in which the uncomfortable feeling and anxiety are not given to the driver as the VGRS control amount. For example, the VGRS control amount calculation unit 24 stores preliminarily an upper limit value of the yaw rate which is generated by the driver in an ordinary traveling or an upper limit value of a lateral G (lateral acceleration) which is generated in ordinary traveling, and with the above-described value as a threshold value, sets the VGRS control amount so as to be suppressed to be equal to or less than the threshold value. Here, the predetermined period of time from the time of the PCS operation start is shorter than the period from the PCS operation start to the time point when the target control amount is obtained, and for example, is a time period from the PCS operation start to the time point when the EPS control amount exceeds approximately half the target control amount. The predetermined period of time from the time of the PCS operation start may be, for example, from the PCS operation start to a time immediately after the PCS operation start.

The VGRS control amount calculation unit 24 adjusts the VGRS control amount such that a rate of the EPS control amount increases as the time passes. In this case, the VGRS control amount is adjusted such that the EPS control amount is within the range in which the driver does not feel the uncomfortable feeling or the anxiety due to the rapid rotation of the steering wheel by the control of the EPS 7. For example, the VGRS control amount calculation unit 24 stores preliminarily the upper limit value of the steering speed in ordinary driving (by a test driving or the like), and with the value as the threshold value, adjusts the VGRS control amount so as to be equal to or less than the threshold value. The VGRS control amount calculation unit 24 may measure a reaction force generated against the steering wheel when the speed brake is pressed or during the traveling, and with the measured reaction force as the threshold value, may adjust the VGRS control amount so as to be equal to or less than the threshold value. This reaction force is generated in ordinary driving, and thus, can be used as an index of the reaction force in which the driver does not feel the uncomfortable feeling. The VGRS control amount calculation unit 24 outputs the VGRS control amount to the VGRS 6. The VGRS control amount calculation unit 24 outputs the VGRS reset request to the VGRS 6 in response to the determination by the PCS operation determination unit 21 that the PCS end condition is satisfied, and causes the VGRS 6 to stop the control.

The EPS control amount calculation unit 25 has a function of calculating the EPS control amount. The EPS control amount calculation unit 25 calculates the EPS control amount which is necessary for realizing the target control amount calculated by the target control amount calculation unit 23. Specifically, as the EPS control amount, EPS control amount calculation unit 25 calculates the amount which is a short portion for realizing the target control amount with respect to the VGRS control amount calculated by the VGRS control amount calculation unit 24. The EPS control amount calculation unit 25 outputs the EPS control amount to the EPS 7. The EPS control amount calculation unit 25 outputs the EPS reset request to the EPS 7 in response to the determination by the PCS operation determination unit 21 that the PCS end condition is satisfied, and causes the EPS 7 to stop the control.

The HMI control unit 26 has a function of controlling the HMI 8. The HMI control unit 26, for example, outputs the HMI output request to the HMI 8 for displaying predetermined information on the HMI 8. The HMI control unit 26, for example, may output the HMI output request to the HMI 8 for outputting a predetermined message by a voice to the HMI 8. The HMI control unit 26 outputs the information that the PCS is operating to the HMI 8. The HMI control unit 26 outputs an HMI reset request to the HMI 8 in response to the determination by the PCS operation determination unit 21 that the PCS end condition is satisfied, and causes the HMI 8 to stop the display and the voice output.

Figure 2:
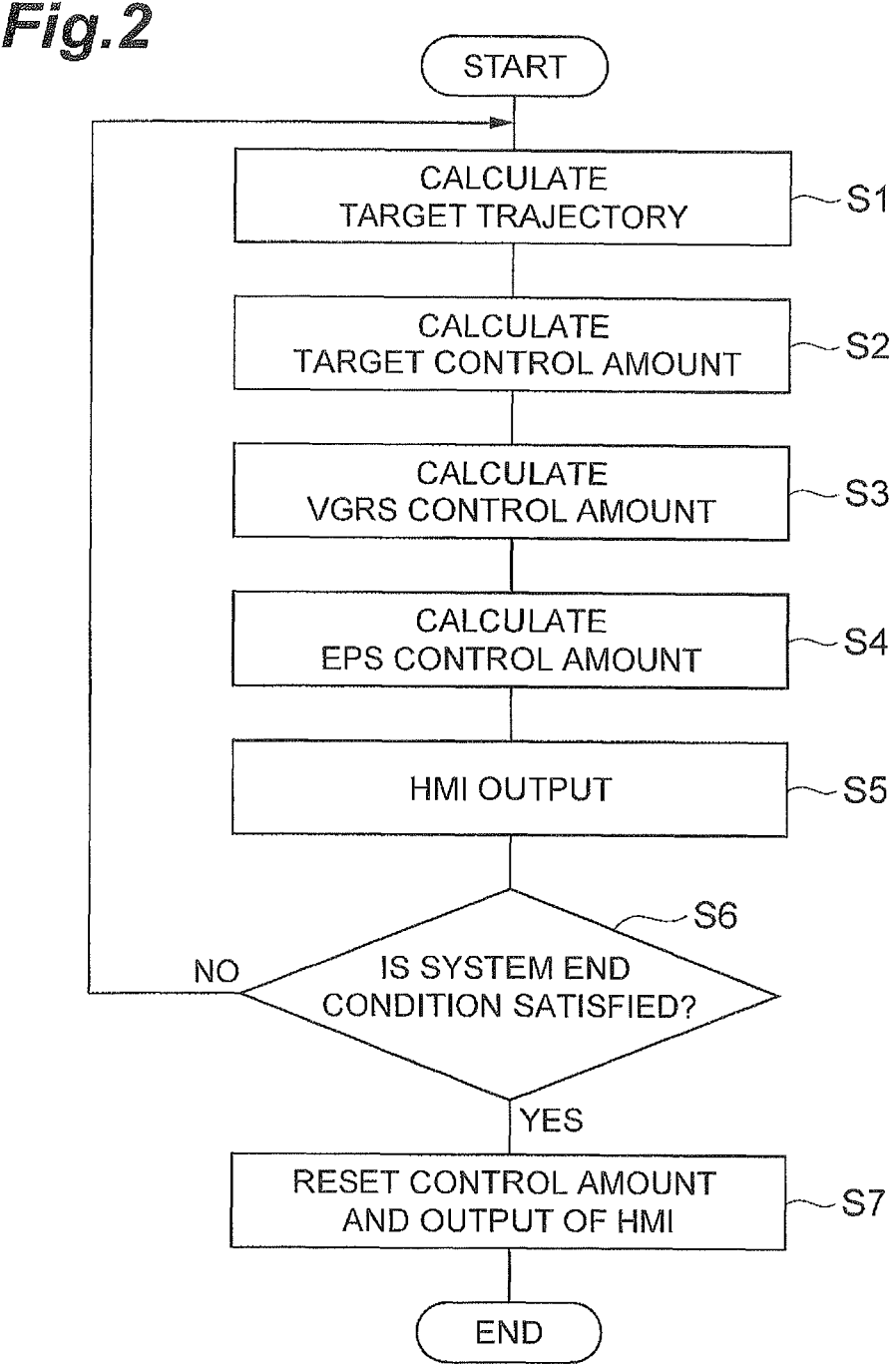
FIG. 2 is a flowchart illustrating an example of processing content of the collision avoidance assistance device in FIG. 1.

Next, an example of collision avoidance assistance processing in the collision avoidance assistance device 1 will be described. FIG. 2 is a flowchart illustrating an example of processing content of the collision avoidance assistance device 1. The collision avoidance assistance processing starts in response to the determination by the PCS operation determination unit 21 that the PCS operation start condition is satisfied.

First, the target trajectory calculation unit 22 calculates the target trajectory based on the obstacle information and the travelable area information output by the peripheral information acquisition unit 3 (target trajectory calculation step S1). Then, the target control amount calculation unit 23 calculates the target control amount based on the vehicle information output by the vehicle information acquisition unit 4 in order for causing the vehicle to travel along the target trajectory calculated by the target trajectory calculation unit 22 in the target trajectory calculation step S1 (target control amount calculation step S2).

Subsequently, the VGRS control amount calculation unit 24 calculates the VGRS control amount and outputs the VGRS control amount to the VGRS 6 (VGRS control amount calculation step S3, first control amount calculation step). Here, the VGRS control amount calculation unit 24 calculates the VGRS control amount based on the vehicle information output by the vehicle information acquisition unit 4. The VGRS control amount calculation unit 24 calculates a maximum value within the range in which the uncomfortable feeling and anxiety are not given to the driver as the VGRS control amount immediately after the PCS operation starts.

The VGRS control amount calculation unit 24 adjusts the VGRS control amount such that the rate of the EPS control amount to the target control amount increases as the time passes. In this case, the VGRS control amount is adjusted such that the EPS control amount is within the range in which the driver does not feel the uncomfortable feeling or the anxiety due to the rapid rotation of the steering wheel by the control of the EPS 7.

When the VGRS 6 receives the VGRS control amount output by the VGRS control amount calculation unit 24, the VGRS 6 controls each device such that the VGRS control amount can be obtained.

Subsequently, the EPS control amount calculation unit 25 calculates the EPS control amount and outputs the EPS control amount to the EPS 7 (EPS control amount calculation step S4, second control amount calculation step). Here, as the EPS control amount, EPS control amount calculation unit 25 calculates the amount which is a short portion for realizing the target control amount with respect to the VGRS control amount calculated by the VGRS control amount calculation unit 24, in the VGRS control amount calculation step S3.

When the EPS 7 receives the EPS control amount output by the EPS control amount calculation unit 25, the EPS 7 controls each device such that the EPS control amount can be obtained.

Subsequently, the HMI control unit 26 outputs the HMI output request to the HMI 8 in order to notify the driver of the fact that the PCS is operating. When the HMI 8 receives the HMI output request output by the HMI control unit 26, the HMI 8 notifies the driver of the fact that the PCS is operating by the display, the voice output or the like (HMI output step S5). Here, the HMI 8 may notify the driver of the direction of the target trajectory by the strength of the voice, the display position of the light indicator, displaying the arrow or the like.

Then, the PCS operation determination unit 21 determines whether or not the PCS end condition is satisfied (PCS end determination step S6). In a case where it is not determined that the PCS end condition is satisfied in the PCS end determination step S6 (No in the PCS end determination step S6), the process returns to the target trajectory calculation step S1, and the processing tasks in the target trajectory calculation step S1 to the PCS end determination step S6 are performed again.

On the other hand, in a case where it is determined that the PCS end condition is satisfied in the PCS end determination step S6 (Yes in the PCS end determination step S6), the VGRS control amount calculation unit 24 outputs the reset request to the VGRS 6 to reset the VGRS control amount, and causes the VGRS 6 to stop the control. In addition, the EPS control amount calculation unit 25 outputs the reset request to the EPS 7 to reset the EPS control amount, and causes the EPS 7 to stop the control. In addition, the HMI control unit 26 outputs the reset request to the HMI 8 and causes the HMI 8 to stop the display and the voice output (reset step S7). Then, the collision avoidance assistance processing in the collision avoidance assistance device 1 ends.

Next, the operation effects of the collision avoidance assistance device 1 will be described. FIG. 3 is a diagram illustrating a relationship between the tire angle and the time. The horizontal axis indicates the time passed from the PCS operation start and the vertical axis indicates the tire angle. The graph A illustrates the relationship between the tire angle and the time in a case where both the VGRS 6 and the EPS 7 are used. The graph B illustrates the relationship between the tire angle and the time in a case where only the EPS 7 is used. In addition, a region Peps indicates the EPS control amount and a region Pvgrs indicates the VGRS control amount. Here, the description is made using the tire angle. However, another control amount may be used.

As illustrated in FIG. 3, the collision avoidance assistance device 1 performs the PCS of the collision avoidance assistance by the VGRS 6 and the EPS 7. Then, in the collision avoidance assistance device 1, the rate of the VGRS control amount to the target control amount increases immediately after the PCS operation start (at initial stage of the PCS operation). For this reason, at the initial stage of the PCS operation, the steering force is mainly given by the VGRS 6. In the VGRS 6, since the reaction force is not generated against the steering wheel, the tire angle can be increased while the behavior of the steering wheel is suppressed, and thus, it is possible to decrease the interference between the steering force by the driver and the steering force by the collision avoidance assistance device 1. As a result thereof, the uncomfortable feeling to the driver can be decreased and the large lateral movement amount (lateral acceleration) can be obtained in a short time.

In the collision avoidance assistance device 1, the rate of the VGRS control amount to the target control amount decreases and the rate of the EPS control amount increases as the time passes. In the EPS 7, since the reaction force is generated against the steering wheel, it is possible to make the driver recognize the PCS operation and the direction of the steering assistance via the reaction force. In addition, by gradually increasing the rate of the EPS control amount to the target control amount as the time passes, it is possible to suppress the rapid rotation of the steering wheel and to make the driver recognize the PCS operation and the direction of the steering assistance by the PCS. As a result thereof, the uncomfortable feeling to the driver can be further decreased.

In addition, the slope of the graph A is substantially constant, and is less than the maximum slope of the graph B. That is, by using both the VGRS 6 and the EPS 7, the target tire angle can be obtained at the earlier time compared to the case where only the EPS 7 is used, and thus, it becomes possible to improve the responsiveness of the collision avoidance assistance of the PCS.

The VGRS control amount may be set within the range in which the uncomfortable feeling and anxiety are not given to the driver, or at the initial stage of the PCS operation, may be set to the maximum value within the range in which the uncomfortable feeling and anxiety are not given to the driver.

In this case, it is possible to increase the tire angle without giving the uncomfortable feeling and anxiety to the driver.

The EPS control amount may be set within the range in which the uncomfortable feeling and anxiety due to the rapid rotation of the steering wheel are not given to the driver. In this case, it is possible to increase the tire angle without giving the uncomfortable feeling and anxiety to the driver.

In addition, the collision avoidance assistance device 1 includes the HMI 8 that notifies the driver of the PCS operation and the direction of the steering assistance by the PCS. In this way, it is possible to make the driver recognize the PCS operation and the direction of the steering assistance by the PCS. Therefore, it becomes possible to further decrease the uncomfortable feeling to the driver. In addition, in a case where the PCS operates in a situation in which the collision avoidance assistance is not needed, it becomes possible to urge the driver to cope with the situation.

The present invention is not limited to the embodiment described above. For example, instead of the VGRS 6, another system in which the stress is not generated against the steering wheel at the time of steering assistance may be used, or for example, active rear steer (ARS) may be used.

In addition, instead of the EPS 7, another system in which the stress is generated against the steering wheel at the time of steering assistance may be used.

Industrial Applicability

The present invention can be used in a collision avoidance assistance device and a collision avoidance assistance method.

Reference Signs List

1 Collision avoidance assistance device
  6 VGRS (first steering assistance system)
  7 EPS (second steering assistance system)
  8 HMI (notification unit)
  23 target control amount calculation unit
  24 VGRS control amount calculation unit (first control amount calculation unit)
  25 EPS control amount calculation unit (second control amount calculation unit)
  S2 target control amount calculation step
  S3 VGRS control amount calculation step (first control amount calculation step)
  S4 EPS control amount calculation step (second control amount calculation step)

The invention claimed is:

1. A collision avoidance assistance device configured to perform collision avoidance assistance by a first steering assistance system in which a reaction force is not generated against a steering wheel and a second steering assistance system in which a reaction force is generated against the steering wheel, the device comprising:
    a target control amount calculation unit configured to calculate a target control amount used for travelling on a target trajectory through which the vehicle passes;
    a first control amount calculation unit configured to calculate a first control amount to be applied by the first steering assistance system out of the target control amount, and output the first control amount to the first steering assistance system; and
    a second control amount calculation unit configured to calculate a second control amount to be applied by the second steering assistance system out of the target control amount, and output the second control amount to the second steering assistance system, wherein the first control amount is set to be larger than the second control amount during a predetermined time period from a time of starting the collision avoidance assistance.

2. The collision avoidance assistance device according to claim 1,
wherein the first control amount calculation unit outputs the first control amount to the first steering assistance system before the second control amount calculation unit outputs the second control amount to the second steering assistance system.

3. The collision avoidance assistance device according to claim 1,
wherein the first control amount calculation unit decreases a rate of the first control amount to the target control amount as the time passes.

4. The collision avoidance assistance device according to claim 1, further comprising:
a notification unit configured to notify of the fact that the collision avoidance assistance is operating.

5. The collision avoidance assistance device according to claim 4,
wherein the notification unit notifies of the direction of the target trajectory.

6. A collision avoidance assistance method for performing collision avoidance assistance by a first steering assistance system in which a reaction force is not generated against a steering wheel and a second steering assistance system in which a reaction force is generated against the steering wheel, the method comprising:
a target control amount calculation step of calculating a target control amount used for travelling on a target trajectory through which the vehicle passes;
a first control amount calculation step of calculating a first control amount to be applied by the first steering assistance system out of the target control amount, and outputting the first control amount to the first steering assistance system; and
a second control amount calculation step of calculating a second control amount to be applied by the second steering assistance system out of the target control amount, and outputting the second control amount to the second steering assistance system,
wherein the first control amount is set to be larger than the second control amount during a predetermined time period from a time of starting the collision avoidance assistance.

\* \* \* \* \*